United States Patent

Singh et al.

[11] Patent Number: 5,516,597
[45] Date of Patent: May 14, 1996

[54] PROTECTIVE INTERLAYER FOR HIGH TEMPERATURE SOLID ELECTROLYTE ELECTROCHEMICAL CELLS

[75] Inventors: Prabhakar Singh, Export; Theodore R. Vasilow, Manor, both of Pa.; Von L. Richards, Angola, Ind.

[73] Assignee: Westinghouse Electric Corporation, Pittsburgh, Pa.

[21] Appl. No.: 334,990

[22] Filed: Nov. 7, 1994

[51] Int. Cl.$^6$ .................................................. H01M 8/12
[52] U.S. Cl. .................... 429/30; 429/31; 429/33
[58] Field of Search ..................... 429/30–33, 40

[56] References Cited

U.S. PATENT DOCUMENTS

| | | | |
|---|---|---|---|
| H626 | 4/1989 | Covino | 501/12 |
| 3,330,697 | 8/1963 | Pechini | 117/215 |
| 3,400,054 | 9/1968 | Ruka | 204/1 |
| 4,490,444 | 12/1984 | Isenberg | 429/31 |
| 4,543,341 | 9/1985 | Barringer et al. | 501/1 |
| 4,588,575 | 5/1986 | David | 423/594 |
| 4,596,750 | 6/1986 | Ruka et al. | 429/31 X |
| 4,597,170 | 7/1986 | Isenberg | 29/623.5 |
| 4,598,467 | 7/1986 | Isenberg et al. | 29/623.5 |
| 4,609,562 | 9/1986 | Isenberg et al. | 427/8 |
| 4,692,274 | 9/1987 | Isenberg et al. | 252/521 |
| 4,748,091 | 5/1988 | Isenberg | 429/31 |
| 4,885,078 | 12/1989 | Spengler et al. | 204/432 |
| 4,898,792 | 2/1990 | Singh et al. | 429/19 |
| 5,106,706 | 4/1992 | Singh et al. | 429/31 |
| 5,108,850 | 4/1992 | Carlson et al. | 429/31 |

Primary Examiner—Anthony Skapars

[57] ABSTRACT

The invention comprises of an electrically conducting doped or admixed cerium oxide composition with niobium oxide and/or tantalum oxide for electrochemical devices, characterized by the general formula:

$$Nb_xTa_yCe_{1-x-y}O_2$$

where x is about 0.0 to 0.05, y is about 0.0 to 0.05, and x+y is about 0.02 to 0.05, and where x is preferably about 0.02 to 0.05 and y is 0, and a method of making the same. This novel composition is particularly applicable in forming a protective interlayer of a high temperature, solid electrolyte electrochemical cell (10), characterized by a first electrode (12); an electrically conductive interlayer (14) of niobium and/or tantalum doped cerium oxide deposited over at least a first portion (R) of the first electrode; an interconnect (16) deposited over the interlayer; a solid electrolyte (18) deposited over a second portion of the first electrode, the first portion being discontinuous from the second portion; and, a second electrode (20) deposited over the solid electrolyte. The interlayer (14) is characterized as being porous and selected from the group consisting of niobium doped cerium oxide, tantalum doped cerium oxide, and niobium and tantalum doped cerium oxide or admixtures of the same. The first electrode (12), an air electrode, is a porous layer of doped lanthanum manganite, the solid electrolyte layer (18) is a dense yttria stabilized zirconium oxide, the interconnect layer (16) is a dense, doped lanthanum chromite, and the second electrode (20), a fuel electrode, is a porous layer of nickel-zirconium oxide cermet. The electrochemical cell (10) can take on a plurality of shapes such as annular, planar, etc. and can be connected to a plurality of electrochemical cells in series and/or in parallel to generate electrical energy.

3 Claims, 3 Drawing Sheets

Mn Line Profile

Mn Line Profile

PROTECTIVE INTERLAYER FOR HIGH TEMPERATURE SOLID ELECTROLYTE ELECTROCHEMICAL CELLS

GOVERNMENT CONTRACT

The Government of the United States of America has rights in this invention pursuant to Government Contract No. DE-AC21-80ET17089, awarded by the United States Department of Energy.

FIELD OF THE INVENTION

The invention relates to high temperature, solid electrolyte electrochemical devices that are used to convert chemical energy into direct-current electrical energy, especially when used in electrical power plants. More particularly, the invention relates to the use of an effective amount of a novel cerium oxide doped or admixed with niobium oxide and/or tantalum oxide interlayer disposed between an air electrode layer and interconnection layer of a high temperature, solid electrolyte electrochemical fuel cell, the interlayer being electrically conductive and protective of the interconnection material.

BACKGROUND OF THE INVENTION

High temperature, solid electrolyte, electrochemical generators employing interconnected electrochemical fuel cells convert chemical energy into direct current electrical energy at temperatures of about 800° C. to 1200° C. Such solid electrolyte fuel cells and multi-cell generators have been discussed in U.S. Pat. No. 4,395,468 (Isenberg). Fuel electrode, air electrode, solid electrolyte, and interconnection configurations are taught in U.S. Pat. No. 4,490,444 (Isenberg). Each electrochemical fuel cell typically includes a porous support tube (optional) made of, e.g., calcia stabilized zirconia, and about 1 to 2 mm thick. A porous air electrode or cathode is deposited on and generally surrounds the support tube made of, e.g., lanthanum manganite ($LaMnO_3$), and about 0.05 to 1.5 mm thick. A dense, gas-tight, solid electrolyte is deposited on and substantially surrounds the outer periphery of the air electrode made of, e.g., yttria stabilized zirconia ($(ZrO_2)_{0.9}(Y_2O_3)_{0.1}$), and about 0.001 to 0.1 mm thick. A porous fuel electrode or anode is deposited on and substantially surrounds the outer periphery of the solid electrolyte made of, e.g., nickel-zirconia cermet or cobalt-zirconia cermet, and about 0.1 mm thick. Both the solid electrolyte and the fuel electrode are discontinuous to allow for inclusion of the interconnect on the air electrode to provide means to electrically connect adjacent electrochemical fuel cells. A dense, gas-tight, interconnect is deposited on a selected radial segment of the air electrode, at the portion that is discontinuous in the electrolyte and fuel electrode, made of calcium, strontium, or magnesium doped lanthanum chromite ($LaCrO_3$), and about 0.03 mm to 0.1 mm thick. A top layer is deposited over the interconnect made of nickel-zirconia cermet or cobalt-zirconia cermet, and about 0.1 mm thick. In multi-cell solid electrolyte electrochemical generators, the individual cells are connected at least in series through the electrically conducting interconnect with remains exposed to both fuel and oxidant gases.

Various air electrode compositions are taught in U.S. Pat. Nos. 4,562,124 (Ruka); 4,751,152 (Zymboly); 4,888,254 (Reichner); and, 5,108,850 (Carlson, et al.). The air electrode as taught are comprised of doped, e.g., strontium, calcium, barium, cerium, and/or chromium doped lanthanum manganite materials which have compatible chemical and thermal expansion properties with the electrolyte and interconnect materials. The air electrode materials that are presently being used are doped lanthanum manganite compositions, the nature and level of doping being selected on the basis of improvements in the electrode conductivity and structural stability of the air electrode. Various methods have been used to apply both the electrolyte and interconnect material to the top of the air electrode. Conventionally, both the electrolyte and the interconnect material are applied to the surface of different selected portions of the air electrode by a modified electrochemical vapor deposition process at temperatures of about 1200° C. to 1400° C., employing the use of vaporized halides of zirconium and yttrium for the electrolyte and of lanthanum, chromium, magnesium, calcium or strontium for the interconnect for deposition on the air electrode as taught in U.S. Pat. Nos. 4,597,170 (Isenberg) and 4,609,562 (Isenberg, et al.).

Such halide vapors can interact with and degrade the air electrode material and adjacent interfaces during the initial period of electrolyte and interconnect application. This can cause, in some instances, leaching of air electrode constituents, e.g. lanthanum, manganese, calcium, etc. Leaching of the air electrode constituents accordingly results in alteration of electrical, chemical and mechanical properties of the air electrode, due to substantial modification at the electrolyte as well as at the interconnect interface. Interconnection layer applied by other techniques are also liable to degrade with time due to continuing interaction with the air electrode. Additionally, even after electrolyte and interconnect application, there may be long term diffusion of manganese from the air electrode into the interconnect during operation of the electrochemical fuel cell, which accordingly results in alteration of electrical, chemical and mechanical properties of the interconnect interface and, consequently, reduces the life of the electrochemical cells.

During prolonged exposure of electrochemical cells to elevated operating temperatures of about 1000° C., it has been observed that the interconnect (i.e., doped $LaCrO_3$) in contact with the air electrode (i.e., doped $LaMnO_3$) undergoes structural changes. Void formation and second phase precipitates comprised of Mn—Cr oxides have been identified which mostly occur at the grain boundary of the interconnect. Manganese diffusion from the air electrode at the air electrode-interconnect interfacial boundary accordingly destabilizes and degrades the microstructure of the interconnect by such grain boundary separation and porosity. This diffusion of air electrode constituents during electrochemical operations, reduces the efficiency of the electrochemical cells and reduces the life expectancy and reliability of the electrochemical cells.

There is a need to protect the interconnect over long term operation of electrochemical cells from leaching of the constituents of the air electrode, especially manganese, into the interconnect which consequently and disadvantageously alters the microstructure of the interconnect. Any protective interlayer provided between the air electrode and interconnect must remain nonreactive, electrically conductive and chemically compatible with the air electrode and interconnect.

SUMMARY OF THE INVENTION

It is an object of the invention to provide an electrically conductive metal oxide composition for electrochemical devices in an effective amount which remains chemically, electrically, and mechanically inert during exposure to elevated temperatures in order to provide electrically conductive metal oxide barrier layers, which prevent or minimize interdiffusion between constituent elements of the air electrodes and the interconnects of the electrochemical devices.

It is another object of the invention to provide an effective amount of an electrically conductive metal oxide composition as a protective barrier layer disposed between an air electrode and an interconnect of a high temperature, solid electrolyte electrochemical cell or fuel cell, for minimizing chemical, electrical, and/or structural degradation of the interconnect from leaching of the air electrode constituents.

It is yet another object of the invention to provide an electrically conductive niobium and/or tantalum doped or admixed cerium oxide composition as a protective barrier layer disposed between an air electrode of doped lanthanum manganite and an interconnect of doped lanthanum chromite of a high temperature, solid oxide electrolyte electrochemical cell, for providing a barrier for manganese diffusion during long term exposure to elevated temperatures while also remaining chemically compatible with the air electrode and interconnect.

It is yet another object of the invention to provide a method for making a submicron size powder of electrically conductive solid solution of doped metal oxides for use in electrochemical devices.

It is still another object of the invention to provide a method for making a high temperature, solid electrolyte electrochemical cell and cell stacks having an interlayer disposed between an air electrode and interconnect to protect the interconnect from degradation during long term electrochemical operations.

It is an advantage of the invention to reduce void formation in an interconnect in contact with an air electrode of an electrochemical cell.

It is another advantage of the invention to reduce second phase precipitates causing boundary separation of an interconnect in contact with an air electrode of an electrochemical cell.

The invention resides in electrically conductive doped or admixed cerium oxide compositions for insertion as a protective barrier in electrochemical devices, for instance in high temperature, solid electrolyte fuel cell generators, the compositions being positioned between the air electrodes and interconnects of the devices to prevent or minimize interdiffusion between the constituent elements of the air electrodes and interconnects, and being characterized by the general formula:

$A_zCe_{1-z}O_2$ where z is about 0.005 to 0.1, preferably about 0.02 to 0.05, and A is a dopant or admixture selected from the group of Nb, Ta, or other element which makes the interlayer electrically conductive. The electrically conductive doped or admixed cerium oxide compositions are more preferably characterized by the general formula:

$Nb_xTa_yCe_{1-x-y}O_2$ where x is about 0.0 to 0.05, y is about 0.0 to 0.05, and x+y is about 0.02 to 0.05, and where x is more preferably about 0.02 to 0.05 and y is 0.

The invention further resides in a method of making a high temperature, solid electrolyte electrochemical cell, characterized by: (A) providing a first electrode; (B) applying an electrically conductive interlayer of niobium and/or tantalum doped or admixed cerium oxide over at least a first portion of the first electrode; (C) applying an interconnect over the interlayer; (D) applying a solid electrolyte over a second portion of the first electrode, the first portion being discontinuous from the second portion; and, (E) applying a second electrode over the solid electrolyte. The interlayer is characterized as being porous and selected from the group consisting of niobium doped cerium oxide, tantalum doped cerium oxide, and niobium and tantalum doped cerium oxide, and other electrically conductive metal doped cerium oxide, or admixed oxides of the same. The first electrode is a porous, air electrode of doped lanthanum manganite, the solid electrolyte is a dense, solid oxide of yttria stabilized zirconium oxide, the interconnect is a dense, doped lanthanum chromite, and the second electrode is a porous, fuel electrode of nickel-zirconium oxide cermet. The electrochemical cell can optionally include a support structure of calcia stabilized zirconia in contact with the first electrode and a conductive top layer of nickel-zirconia cermet over the interconnect. The electrochemical cell can take on a plurality of shapes such as annular, planar, etc.

The invention further resides in a method of forming an interlayer in a high temperature, solid electrolyte electrochemical cell characterized by: (A) preparing submicron powder of niobium and/or tantalum doped cerium oxide in solid solution or admixed niobium and/or tantalum and cerium oxides; (B) providing a slurry of the doped or admixed cerium oxide powder; (C) coating the slurry on at least the first portion of the first electrode; and, (D) sintering the metal oxide powder slurry at a temperature of about 900° to 1350° C., preferably about 1200° to 1300° C., to form the interlayer of about 0.001 to 0.005 mm thick on the first electrode.

The invention also resides in a method of making a doped niobium and/or tantalum cerium oxide submicron powder, characterized by: (A) preparing a solution of a metallic alkoxide dissolved in an organic solvent, such as a lower alcohol, the metallic alkoxide having the following general chemical formula:

$M(OR)_x$ where M is a metal ion selected from Ce, Nb and Ta, x is determined by the valence of the metal, and R is an alkyl group, preferably niobium ethoxide and/or tantalum ethoxide; (B) preparing a solution of a metallic carbalkoxide dissolved in a second organic solvent, such as a lower alcohol, the metallic carbalkoxide having the following general chemical formula:

$M(R^1CO_2R^2)_x$ where M is a metal ion selected from Ce, Nb and Ta, x is determined by the valence of the metal, and $R^1$ and $R^2$ are each independently alkyl groups, preferably cerium (III) 2-ethyl hexanoate; (C) mixing the solutions from steps (A) and (B) in an amount to obtain the desired cation solid solution stoichiometry and to induce polymerization of the organometallic compounds to produce a cross-linked amorphous metal oxide gel; (D) drying the metal oxide gel of step (C) in air at about 110° C.; (E) calcining the product of step (D) in air at about 650° C. to volatilize the organics and to form a powder solid solution of the doped metal oxide; and, (F) deagglomerating the metal oxide powder of step (E) by dispersing in an organic solvent and by sonicating to reduce the metal oxide powder to submicron particle size.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS OF THE INVENTION

As shown in U.S. Pat. Nos. 4,490,444 (Isenberg); and, 5,108,850 (Carlson, et al.), both incorporated by reference herein in their entireties, a high temperature, solid electrolyte electrochemical fuel cell arrangement or fuel cell stack comprises a plurality of elongated annular fuel cells. Each fuel cell is typically tubular, although other geometric configurations, e.g., flat plates, are equally possible, and is electrically connected at least in series to an adjacent fuel cell. The electrical connection is made along a selected axial length of the fuel cells, typically along the entire electrochemically active length. Each cell or cell stack uses a natural or synthetic fuel gas such as $H_2$, CO, $CH_4$, natural gas, gaseous hydrocarbons, etc., and an oxidant such as $O_2$ or air at operating temperatures of about 800° C. to 1200° C., typically about 1000° C., to electrochemically react and directly convert chemical energy of the oxidizable fuel into direct current (DC) electrical energy, heat, and water vapor (steam). Each cell typically generates a rather small open circuit voltage of about one volt, and accordingly, multiple cells are typically connected at least in series in order to generate a higher output voltage.

Figure 1:
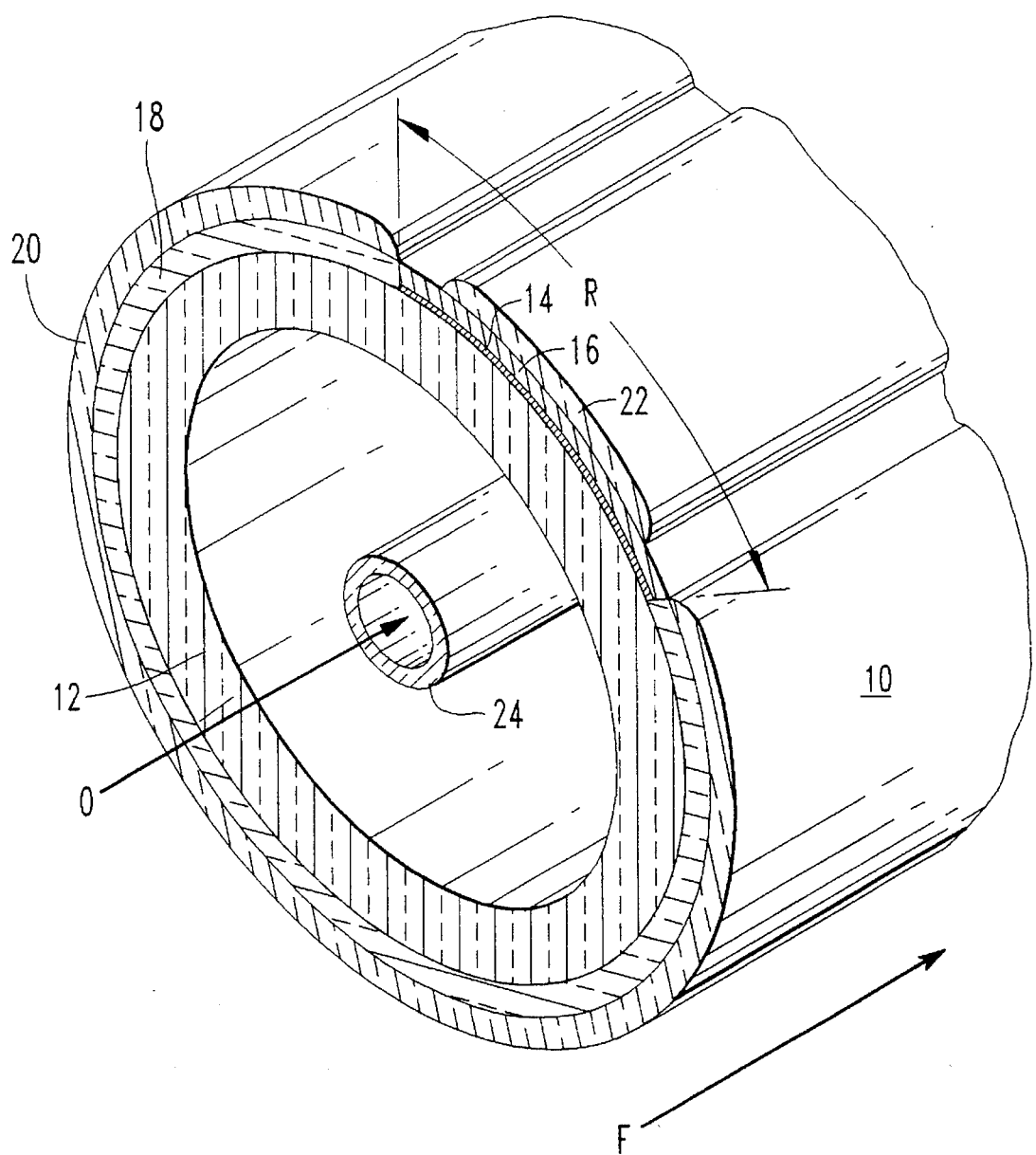
FIG. 1 is a sectional view of a high temperature, solid electrolyte fuel cell including a protective interlayer of the invention.

In the drawings, referring to FIG. 1, a preferred tubular configuration of the electrochemical fuel cell 10 of this invention is shown. The preferred fuel cell configuration 10 includes a self-supported inner air electrode or cathode 12, a protective interlayer 14 deposited over at least the portion of the air electrode responsible for electrical interconnection to an adjacent fuel cell, an interconnect 16 deposited over the protective interlayer 14, a solid electrolyte 18 deposited over a selected portion of the air electrode 12, and an outer fuel electrode or anode 20 deposited over the solid electrolyte 18. The preferred configuration is based upon a fuel cell system wherein a flowing gaseous fuel, shown as F, such as $H_2$, CO, or unreformed hydrocarbon gases such as methane, propane, butane, natural gas, etc., shown as F, is directed axially over the outside of the fuel cell and an oxidant, shown as O, such as air or $O_2$, is directed through the inside of the fuel cell. The fuel cell 10 may also include as optional porous support tube (not shown) used to support the air electrode.

During electrochemical operations, the electrochemical reactions occur at the electrode-electrolyte interfaces according to Equations (1) and (2) where reformed natural gas or, e.g., hydrogen gas, is the fuel.

Cathode: $O_2 + 4e^- \rightleftharpoons 2O^{2-}$ (1)

Anode: $2O^{2-} + 2H_2 \rightleftharpoons 2H_2O + 4e^-$ (2)

The foregoing description of the preferred tubular configuration of the fuel cell of the invention is merely exemplary and should not be considered limiting in any manner. It is possible that other configuration for the fuel cell could be used such as, e.g., flat plate fuel cells or the like. In addition, it is possible that the location of the fuel and oxidant can be interchanged such that the fuel is directed through the inside of the fuel cell and oxidant is directed over the outside of the fuel cell. This requires reversal of the cell electrodes and is termed an inverted fuel cell. It should also be recognized that the interlayer of the invention could be applied to electrochemical cells other than fuel cells, such as gas sensors, electrolysis cells, and the like.

Where the fuel cell is as shown in FIG. 1, oxygen molecules pass through the air electrode and are converted to oxygen ions at the air electrode-electrolyte interface. The oxygen ions pass through the electrolyte to combine with the fuel at the fuel electrode-electrolyte interface. As shown by Equations (1) and (2) described above, the oxidant which is fed into the inside of the fuel cell is electrochemically reduced at the cathode-electrolyte interface forming oxygen ions which migrate through the solid electrolyte lattice to the anode-electrolyte interface where fuel is fed over the outside of the fuel cell and is electrochemically oxidized releasing electrons which flow through an external load circuit to the cathode, thereby generating a flow of electrical current. The electrochemical reaction of the oxidant with the fuel thus produces a potential difference across the external load circuit which maintains a continuous electron and oxygen ion flow in a closed circuit whereby useful electrical power can be derived. A more complete description of the operation of this type of electrochemical fuel cell and cell stack can be found in U.S. Pat. No. 3,400,054 (Ruka), incorporated by reference herein in its entirety.

Referring again to FIG. 1, in a preferred form, each fuel cell 10 includes a porous air electrode 12 which also provides structural integrity to the fuel cell. A porous support tube (not shown) comprised of calcia stabilized zirconia ($ZrO_2$) of about 1 to 2 mm thick can optionally be provided to support the air electrode which would generally surround the outer periphery of the support tube. The porous air electrode 12 is comprised of a mixed metal oxide structure of about 1.5 to 3.0 mm thickness and is fabricated by well-known techniques such as extrusion and sintering techniques. The air electrode is typically comprised of doped and undoped mixtures of metal oxides such as $LaMnO_3$, $CaMnO_3$, $LaNiO_3$, $LaCoO_3$, $LaCrO_3$ and other electrically conducting metal oxides. The dopants are typically Sr, Ca, Co, Ni, Fe, Sn, Ba, Ce or the like. The preferred air electrode now in conventional use is comprised of doped and undoped $LaMnO_3$, preferably $La_{0.8}Ca_{0.2}MnO_3$.

Generally surrounding the air electrode 12 and at least at a selected radial segment or portion, shown as R, of the air electrode is the protective interlayer 14 of this invention. The interlayer 14 as shown is disposed on top of the air electrode 12 forming a barrier between the air electrode 12 and the interconnect 16, and optionally can also be disposed on top or the solid electrolyte 20 (not shown). The interlayer 14 provides a barrier layer which is electrically conductive and protective of the interconnect material in preventing diffusion of air electrode constituents, such as manganese, into the interconnect during electrochemical cell operations at elevated temperatures. The interlayer is especially selected from a material which remains electrically conducting and remains compatible with the air electrode and interconnect to, inter alia., prevent grain boundary separation and void formation in the interconnect.

The most preferred protective interlayer 14 of the invention is comprised of a niobium (Nb) and/or tantalum (Ta) ceria composition either in compound or admixed form. The inventors have discovered that oxides of cerium, such as $CeO_2$, do not react with the air electrode at elevated temperatures of about 800° C. to 1200° C., the typical operating temperature of an electrochemical fuel cell, and accordingly remain intact as a distinct barrier layer during fuel cell processing and fuel cell operations. Moreover, the inventors have further discovered that cerium oxides prevent diffusion of air electrode constituents such as manganese from altering the bulk crystal or the surface of the cerium oxide, eliminating precipitates and void formation at the interfacial boundary between the air electrode and the interconnect or bulk interconnect. Oxides other than cerium oxides may also be used alone or in combination with cerium oxides to form the protective interlayer, i.e., such as constituent oxides of the interconnect material. The inventors have also discovered the electrical conductivity of the cerium oxide interlayer can be improved by forming a solid solution or admixture of cerium oxide with tantalum and/or niobium dopants. The most preferred interlayer is a niobium doped ceria film. The interlayer has a preferred thickness of about 0.001 to 0.005 mm thick.

The protective interlayer can be applied to the air electrode by any of a variety of techniques, such as by slurry spraying, dipping, painting, etc. and then sintering, or by plasma spraying, or by physical, chemical, or electrochemical vapor deposition. The preferred protective interlayer is porous for minimizing stress build up due to thermal expansion mismatch between the air electrode and interlayer. It is preferred to apply the interlayer to the air electrode by coating on the electrode a slurry of a fine powder of the doped ceria in solid solution or admixed ceria and then sintering at temperatures of about 900° C. to 1400° C., preferably about 1200° C. to 1300° C., to form a thin film in contact with the air electrode.

The electrically conductive protective interlayer composition can be represented by the general chemical formula shown in Equation (3).

$$A_zCe_{1-z}O_2 \qquad (3)$$

where z is about 0.005 to 0.1 or other effective amounts to render the composition sufficiently electronically conductive, z is preferably about 0.02 to 0.05, and A is a dopant selected from the group of Nb, Ta, or other element which makes the interlayer electrically conductive.

The preferred protective interlayer composition can be represented by the general chemical formula shown in Equation (4).

$$Nb_xTa_yCe_{1-x-y}O_2 \qquad (4)$$

where x is about 0.0 to 0.05, y is about 0.0 to 0.05, and x+y is about 0.02 to 0.05. In the particularly preferred protective interlayer composition y is 0 and x is about 0.02 to 0.05, having niobium as the particularly preferred dopant. It should be understood that the general chemical formula of the interlayer composition of the invention represents the interlayer in either doped or admixed form.

In the preferred method of depositing the niobium and/or tantalum doped or admixed ceria on the air electrode, it is preferred to first prepare a solid solution or admixture of the interlayer in powder form which can be slurry coated on to the air electrode and then sintered thereon to form the protective barrier film. It is preferred that the ceria powders are finely divided powders having an average particle size of about 0.1 to 1.0 microns. The inventors have discovered a novel method for making powders having the composition described above in Equation (3) from the starting materials of niobium oxide ($Nb_2O_5$) and/or tantalum oxide ($Ta_2O_5$) and cerium oxide ($CeO_2$), and having an even more preferred composition represented by the general chemical formula shown in Equation (5).

$$Nb_xCe_{1-x}O_2 \qquad (5)$$

where x is about 0.02 to 0.05.

The inventors have discovered that conventional doping techniques for forming mixed Nb or Ta metal oxides by co-precipitation of the starting materials are difficult due to the stability of the hydrous oxide of niobium and/or tantalum. Also, the conventional solution techniques for preparing solid solutions of mixed metal oxides of niobates by dissolving freshly precipitated basic metal oxide in a metal oxide complexing acid solution and calcining the resultant resin to form the solid solution as taught in U.S. Pat. No. 3,330,697 (Pechini) are not adequate to produce the niobium and tantalum doped ceria powder for forming the protective interlayer of the invention.

The method of preparation of the finely divided metal oxide powders and solid solution metal oxide powders, particularly niobium and/or tantalum doped cerium oxide powder, of the invention includes: (1) preparing a solution of a metallic alkoxide dissolved in an organic solvent such as a lower alcohol, the metallic alkoxide having the following general chemical formula (A):

$$M(OR)_x \qquad (A)$$

where M is a metal ion selected from Ce, Nb and Ta, x is determined by the valence of the metal, and R is an alkyl group; (2) preparing a solution-emulsion, i.e., a sol-gel, of a metallic carbalkoxide dissolved in organic solvent such as a lower alcohol, the metallic carbalkoxide having the following general chemical formula (B):

$$M(R^1CO_2R^2)_x \qquad (B)$$

where M is a metal ion selected from Ce, Nb and Ta, x is determined by the valence of the metal, and $R^1$ and $R^2$ are each independently alkyl groups; (3) mixing solutions from steps (1) and (2) in an amount to obtain the desired cation solid solution stoichiometry and to induce polymerization of the organometallic compounds to produce a cross-linked amorphous metal oxide gel in solution, i.e., a sol-gel; (4) drying the metal oxide gel of step (3) in air at about 110° C.; (5) calcining the product of step (4) in air at about 650° C. to volatilize the organics and to form a powder solid solution of the doped metal oxide.

The preferred metallic alkoxide of formula (a) is niobium ethoxide ($Nb(OC_2H_5)_5$) and/or tantalum ethoxide ($Ta(OC_2H_5)_5$). The preferred metallic carbalkoxide of formula (b) is cerium (III) 2-ethyl hexanoate ($Ce(CO_2CH_2CH(C_2H_5)(CH_2)_3CH_3)_3$). The preferred organic solvent is a lower alcohol such as n-butanol ($CH_3(CH_2)_2CH_2OH$) or the like. The preferred amount of dopant in solid solution is about 2 to 5 mole percent. The method of the invention further includes the step of (6) deagglomerating the metal oxide powder of step (5) dispersed in organic solvent such as methyl ethyl ketone, ethanol and fish oil, or the like, by sonication to reduce to micron particle size of about 0.1 to 10 microns, preferably to submicron particle size of about 0.1 to 0.8 micron.

It should be understood that the interlayer ceria powder can also be prepared by conventional ceramic processing techniques.

The niobium and/or tantalum doped or admixed cerium oxide interlayer 14 of the invention provides the desired properties of electrical conductivity, thermal expansion match, and nonreactivity to the air electrode constituents to serve as an interfacial protective barrier between at least the air electrode and interconnect of the fuel cell. The invention should not be considered as limited to the specific preferred protective interlayer compositions described above in detail. The invention should be considered to include a solid, doped or admixed, cerium oxide material which is electrically conductive, which approximates the thermal expansion characteristics of the air electrode and interconnect between which it is disposed, and which is inert to leaching of air electrode constituents during prolonged electrochemical fuel cell operations at elevated temperatures of from 800° C. to 1200° C. The preferred doped or admixed cerium oxides are those doped or admixed with niobium in an amount of about 2 to 5 mole percent having the chemical formula $Nb_{(0.02\ to\ 0.05)}Ce_{1-(0.02\ to\ 0.05)}O_2$.

Generally surrounding the outer periphery of the interlayer 14 at a selected radial portion, shown as R, on the air electrode 12 is a dense, gas-tight, electrically conductive interconnect 16. It is preferred that the interconnect 16 extends the active axial length of each elongated fuel cell 10 as shown and also it is required to be electrically conductive in both oxidant and fuel environments to which it is exposed. The interconnect can be comprised of doped lanthanum chromite ($LaCrO_3$) with preferred dopants of strontium, calcium or magnesium of about 0.03 mm to 0.1 mm thick. The interconnect 16 can be deposited on the air electrode 12 by well known high temperature, electrochemical vapor deposition techniques or by plasma spray deposition techniques.

The interconnect should be highly electrically conductive at temperatures of about 1000° C., the typical operating temperature of the fuel cell, should have a coefficient of thermal expansion close to that of the interlayer and air electrode, and should be dense enough to be gas-tight to prevent intermixing of fuel and oxidant during fuel cell operations which reduces the efficiency of the fuel cell due to localized burning of the fuel as opposed to generation of electrical power, and also degrades the fuel cell components, consequently reducing the life expectancy and reliability of the fuel cells and the generator.

Generally surrounding the interconnect 16 is an electrically conductive top layer 22. The top layer 22 can be comprised of the same material as the fuel electrode 20, i.e., nickel-zirconia or cobalt-zirconia cermet of about 0.1 mm thick. The top layer 22 can be deposited on the interconnect 16 by the same techniques as the fuel electrode. Also shown in the Figure is an optional oxidant feed tube 24 in the interior of the air electrode for entry of oxidant.

Generally surrounding the outer periphery of the air electrode 12 at a selected portion not including the interlayer at portion R is a dense, gas-tight solid electrolyte 18. The solid electrolyte 18 can be comprised of yttria stabilized zirconia (($Y_2O_3$) ($ZrO_2$)) of about 0.001 to 0.1 mm thick. The electrolyte 18 can be deposited onto the air electrode 12 by well known high temperature, electrochemical vapor deposition techniques. In the case where the interconnect 16 is deposited on the interlayer 14 first, which is preferred, then the electrolyte portion of the air electrode is masked initially. In the case where the electrolyte is deposited on the air electrode before the interconnect is deposited on the interlayer, the selected radial portion R of the interlayer is masked during electrolyte deposition to make the electrolyte discontinuous for inclusion of the interconnect. Further in the case where the interlayer generally surrounds the air electrode, the electrolyte is deposited on the interlayer, as well as the interconnect.

Substantially surrounding the outer periphery of the solid electrolyte 18 is a porous fuel electrode or anode 20. The fuel electrode 20 can be comprised of nickel-zirconia or cobalt-zirconia cermet of about 0.1 mm thick. The fuel electrode 20 can be deposited onto the solid electrolyte 18 by well known high temperature, electrochemical vapor deposition techniques. As shown in FIG. 1, the fuel electrode 20 also is discontinuous, being spaced from the interconnect 16 by a distance sufficient to avoid direct electrical communication between the fuel electrode 20 and the interconnect 16 and air electrode 12.

As will be clearly understood, the inventors have discovered that the protective interlayer 14 of this invention of niobium oxide and/or tantalum oxide doped or admixed cerium oxide serves to eliminate electrical, chemical, and structural alterations of the interconnect during high temperature interconnect electrochemical vapor deposition and during prolonged fuel cell operations. As described above, the detrimental alterations to the interconnect such as grain boundary separation of the interconnect forming a second phase in the interfacial and void formation in the bulk of the interconnect are effectively eliminated by the protective and inert interlayer of this invention.

Figure 2:
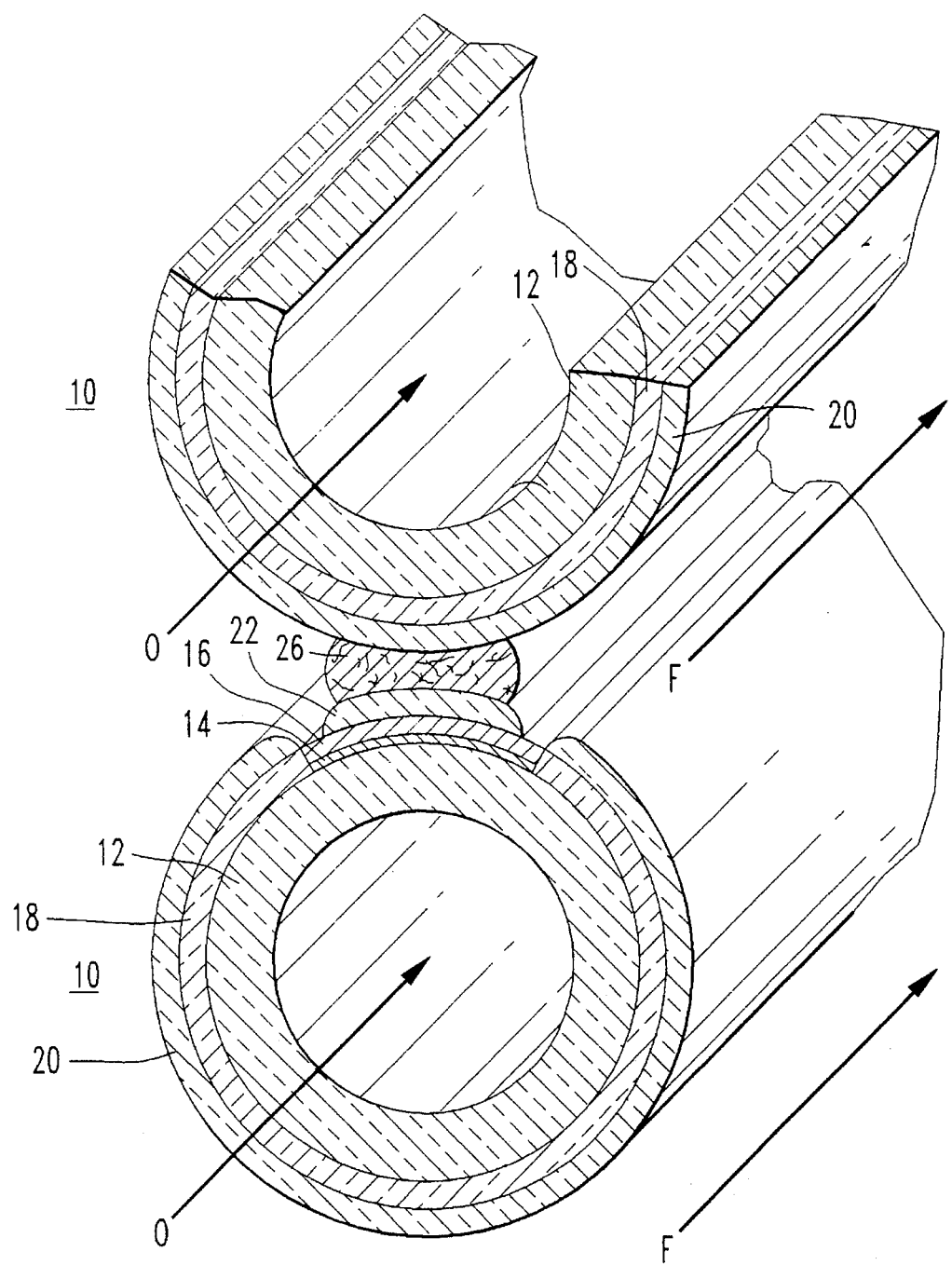
FIG. 2 is a sectional view of a high temperature, solid electrolyte fuel cell stack including interconnected fuel cells of FIG. 1.

Referring now to FIG. 2, this figure shows a series interconnection between adjacent fuel cells 10. The electrical interconnection is preferably enhanced by a metal felt 26 made of nickel fibers. The metal felt 26 extends axially between the fuel cells and is bonded to each by pressure contact which causes sinter bonding during operation. If the fuel cell is inverted, the metal felt is a metal oxide fiber such as doped $In_2O_3$. The adjacent cells 10 are connected via the interconnect 16 from the air electrode (cathode) 12 of one cell to the fuel electrode (anode) 20 of the adjacent cell to provide a serial connection for desired system voltage.

During operation of the depicted fuel cells and fuel cell stacks, oxidant, i.e., air or $O_2$, flows through the interior of the fuel cells and fuel, i.e., $H_2$, CO or unreformed hydrocarbons, flows over the exterior of the fuel cells. Fuel diffuses through the fuel electrode (anode). Oxygen ions pass through to electrolyte from the air electrode (cathode). These reactants electrochemically interact via the actions of the electrolyte and the electrodes, producing products such as water vapor (steam) and carbon dioxide, as well as generating heat and electrical energy. The high temperature water vapor and carbon dioxide are carried away from the fuel cells along with unburned fuel. Electrical current is transferred in series from the air electrode (cathode) of one cell, through the electrically conductive interconnect to the fuel electrode (anode) of the adjacent cell, and ultimately through the load circuit via electrical leads (not shown) to draw the electrical power.

The invention will further be clarified by a consideration of the following examples, which are intended to be purely exemplary of the invention.

EXAMPLE 1

Preparation of Finely Divided Submicron Powders of Niobium Doped Cerium Oxide $Nb_xCe_{1-x}O_2$ where x is from about 0.02 to about 0.05 was prepared by the following procedure. A solution of niobium ethoxide was prepared in n-butanol solvent in a low moisture and low oxygen environment to prevent hydrolysis of the niobium ethoxide with moisture present in the air. A partial solution/emulsion of cerium (III) 2-ethyl hexanoate in n-butanol was prepared. Then, the niobium ethoxide solution is admixed with the cerium 2-ethyl hexanoate solution/emulsion in an amount to provide a desired solid solution of about 2 to 5 mole percent niobium dopant. Then, the solution/emulsion mixture was then dried at about 110° C. in air to begin to transform the gel into powder. Next, the dried material was thermally decomposed by calcination at about 650° C. in air to form the solid solution of metal oxides powder agglomerate. The metal oxide powder was then deagglomerated by high frequency vibration through sonication in a MEK-ethanol solution containing a small amount of fish oil to result in an average particle size powder of about 0.8 microns.

EXAMPLE 2

Preparation of a Fuel Cell with a Protective Interlayer Disposed Between the Air Electrode (LaMnO₃) and the Interconnect (Doped LaCrO₃)

A porous calcium doped lanthanum manganite air electrode tube having about a 12 mm inside diameter and a 15 mm outside diameter and having one opened end and one closed end (fabricated by conventional extrusion, end plugging and sintering techniques) is selected. A 1 to 5 μm protective interlayer layer of niobium doped ceria is deposited over a selected portion of the air electrode where the interconnect will be located using slurry spraying and sintering techniques. The niobium doped ceria used were the finely divided submicron particle size powders prepared in Example 1. The niobium doped ceria powder was slurry sprayed on the selected portion of the air electrode and then heated in air at a temperature of about 1200° C., to form an adherent metal oxide protective layer bonded to the air electrode. The exposed air electrode surface was then masked except for the selected portion by lanthanum chromite and a 10–20 μm thick interconnect of doped lanthanum chromite was deposited over the interlayer by well known electrochemical vapor deposition techniques using chloride vapors of chromium, lanthanum, and strontium. Subsequently, the interconnect was masked using the above masking material. A solid oxide electrolyte of yttria stabilized zirconia of about 20–40 μm thick was deposited over the unmasked portion of the air electrode by known electrochemical vapor deposition techniques using chloride vapors of yttrium and zirconium. A 100–200 μm thick fuel electrode of nickel-zirconia cermet was applied over the electrolyte by known electrochemical vapor deposition techniques.

EXAMPLE 3

Protective Properties of the Interlayer

To investigate the protective properties of the niobium doped cerium oxide interlayer in a fuel cell prepared in Example 2, a microstructure analysis of the interconnect was performed after the fuel cell was exposed for prolonged periods of elevated temperatures to observe whether any grain boundary layer separation or void formation occurred at the interface of the interconnect and air electrode from Mn leaching out of the air electrode. The fuel cell with the interlayer of the invention was compared to a conventional fuel cell without the interlayer between the interconnect and air electrode.

Figure 3A:
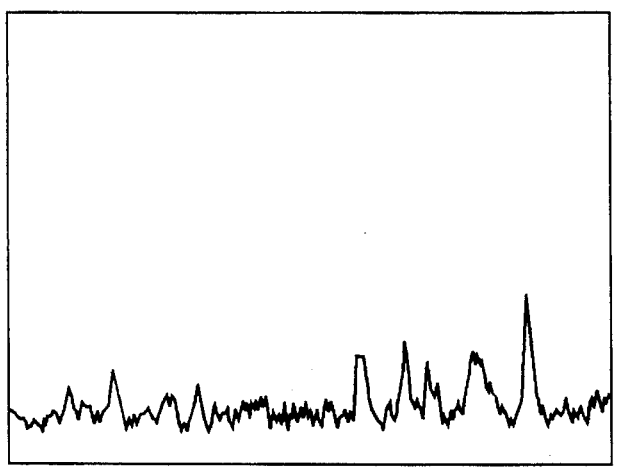
FIG. 3(a) is an elemental analysis of a prior art interconnect showing the presence of Mn after prolonged exposure to high temperatures.

As shown in FIG. 3(a), an elemental analysis of a prior art fuel cell without the interlayer after 1700 hours of operation at 1000° C. shows grain boundary separation and the presence of Mn in the interconnect region and void formation at the grain boundary.

Figure 3B:
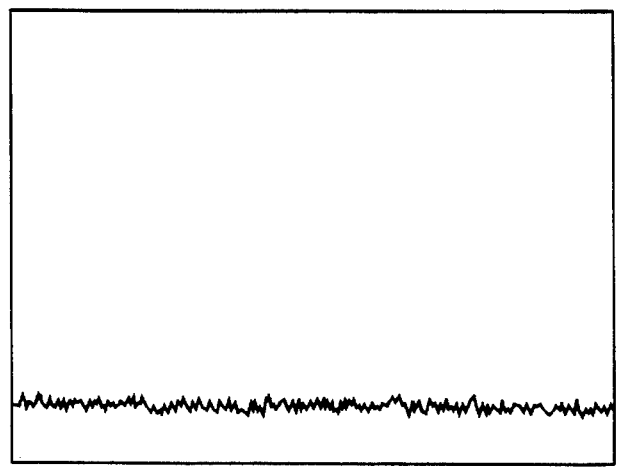
FIG. 3(b) is an elemental analysis of a niobium doped ceria interlayer protected interconnect of the invention showing substantially no presence of Mn after prolonged exposure to high temperatures; and, FIG. 3(c) is an electron diffraction (EDAX) analysis of the niobium doped ceria interlayer protected interconnect of the invention after prolonged exposure to high temperatures showing substantially no Mn diffusion.
Figure 3C:
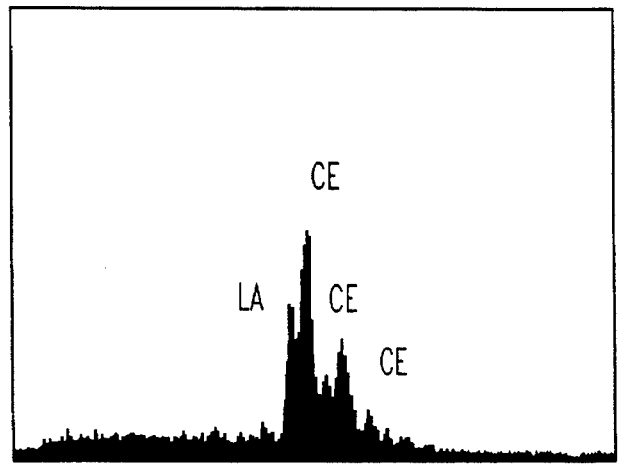

However, as shown in FIG. 3(b), an elemental analysis of the fuel cell of the invention prepared according to Example 2 including the protective interlayer disposed between the interconnect and fuel electrode after 1700 hours of operation at 1000° C. shows no grain boundary separation and no presence of Mn in the interconnect and further no Mn in the bulk interlayer. As shown in FIG. 3(c), an EDAX analysis reveals no Mn leaching into the interlayer prepared according to Example 2 and, accordingly, no Mn leaching into the interconnect.

The invention disclosure incorporates by reference herein all of the hereinabove disclosed U.S. patents in their entireties.

The invention having been disclosed in connection with the foregoing variations and examples, additional variations will now be apparent to persons skilled in the art. The invention is not intended to be limited to the variations and examples specifically mentioned, and accordingly reference should be made to the appended claims rather than the foregoing discussion of preferred examples, to assess the spirit and scope of the invention in which exclusive rights are claimed.

We claim:

1. A high temperature, solid electrolyte electrochemical cell (10), which comprises:

(a) a first electrode (12);

(b) a solid electrolyte (18) disposed on a first portion of said first electrode;

(c) a second electrode (20) disposed on a portion of said solid electrolyte;

(d) an interlayer (14) of electrically conductive doped or admixed cerium oxide disposed on a second portion (R) of said first electrode, to protect an interconnect (16) used for electrical coupling to an adjacent cell and disposed on a portion of said interlayer from degradation from said first electrode constituents.

2. The electrochemical cell (10) of claim 1, in which said first electrode (12) is a porous, air electrode of doped lanthanum manganite, said solid electrolyte (18) is a dense, solid oxide of yttria stabilized zirconium oxide, said second electrode (20) is a porous, fuel electrode of nickel-zirconium oxide cermet, said interlayer (14) is a porous, doped or admixed cerium oxide admixed with an oxide selected from the group consisting of niobium, tantalum and other element that makes the interlayer electrically conductive, and said interconnect (16) is a dense, doped lanthanum chromite.

3. The electrochemical cell (10) of claim 2, in which a plurality of said electrochemical cells (10) are positioned adjacent one another and electrically interconnected through the interconnect (16) between an air electrode (12) of one cell (10) and a fuel electrode (20) of an adjacent cell (10).

* * * * *